US006855301B1

(12) United States Patent
Rich et al.

(10) Patent No.: US 6,855,301 B1
(45) Date of Patent: Feb. 15, 2005

(54) SYNTHESIS METHOD FOR PRODUCING CARBON CLUSTERS AND STRUCTURED CARBON CLUSTERS PRODUCED THEREBY

(75) Inventors: Joseph William Rich, Worthington, OH (US); Vish V. Subramaniam, Powell, OH (US); Elke Christina Plonjes, Columbus, OH (US); Walter Reuben Lempert, Columbus, OH (US)

(73) Assignee: The Ohio State University, Columbus, OH (US)

(*) Notice: Subject to any disclaimer, the term of this patent is extended or adjusted under 35 U.S.C. 154(b) by 288 days.

(21) Appl. No.: 10/116,966

(22) Filed: Apr. 5, 2002

Related U.S. Application Data

(62) Division of application No. 09/692,968, filed on Oct. 20, 2000, now abandoned.

(51) Int. Cl.[7] .......................... C01B 31/00; C01B 21/36; C25B 1/00; C25C 1/00; B05D 3/10
(52) U.S. Cl. .......................... 423/1; 423/291; 423/414; 423/445 R; 427/189; 204/157.4; 204/157.41; 204/157.42; 204/173; 205/464; 205/615
(58) Field of Search ................. 204/157.4, 157.41, 204/157.42, 173; 205/464, 615; 423/1, 291, 414, 445 R; 427/189

(56) References Cited

U.S. PATENT DOCUMENTS

| 4,012,301 A | 3/1977 | Rich et al. ............ 204/157.1 R |
| 4,142,955 A | 3/1979 | Rich et al. ............ 204/157.1 R |
| 4,801,365 A | 1/1989 | Rich et al. ............. 204/157.22 |
| 5,094,915 A | 3/1992 | Subramaniam ............ 428/408 |
| 6,683,783 B1 * | 1/2004 | Smalley et al. ............ 361/502 |
| 2002/0084410 A1 * | 7/2002 | Colbert et al. ............. 250/306 |

OTHER PUBLICATIONS

Maser et al., "Production of Bundles of Single Walled Nanotubes by a Simple Laser Ablation Technique", AIP Conference Proceedings (no month, 1999), vol. 486 (Electronic Properties of Novel Materials—Science and Technology of Molecular Nanostructures), pp. 245–248. Abstract only.*
Kroto et al., "C60: Buckminsterfullerene", Nature (Nov. 1995), vol. 318, No. 6042, pp. 162–163.*
Plönjes et al., *Control of Stability and Electron Removal Rate in Optically Pumped RF Discharges*. AIAA 99–3665, 30th Plasmadynamics and Lasers Conference, (1999) 1–32, no month*.
Plönjes et al., *Ionization Measurements in Optically Pumped Discharges*. J. Phys. D: Appl. Phys. 33 (2000) 2049–2056, no month*.
Plönjes et al., *Time–Resolved Fourier Transform Infrared Spectroscopy of Optically Pumped Carbon Monoxide*. Chemical Physics 256 (2000) 315–331, no month*.

(List continued on next page.)

*Primary Examiner*—Edna Wong
(74) *Attorney, Agent, or Firm*—Standley Law Group LLP

(57) ABSTRACT

The present invention includes carbon synthesis devices and systems. The invention also includes machines and instruments using those aspects of the invention. The present invention also includes methods of carbon synthesis. The present invention includes an array of carbon nanotubes, each nanotube having a longitudinal axis. The nanotubes are placed into an array such that the longitudinal axes of all nanotubes in the array are substantially parallel. The array may be a two-dimensional array or a three-dimensional array. The present invention also includes methods of preparing such carbon molecular clusters and arrays thereof.

30 Claims, 5 Drawing Sheets

OTHER PUBLICATIONS

Plönjes et al., *Vibrational Energy Storage in High–Pressure Mixtures of Diatomic Molecules*, AIAA 99–3480. 30th Plasmadynamics and Lasers Conference (1999) 1–24, no month*.

Rich et al., *Isotope Separation by Vibration–Vibration Pumping*, Nonequilibrium Vibrational Kinetics, vol. 39, (1986) 271–293, no month*.

Nikolaev et al., *Gas–Phase Catalytic Growth of Single–Walled Carbon Nanotubes from Carbon Monoxide*, Chemical Physics Letters 313 (1999) 91–97, no month*.

Hafner et al., *Catalytic Growth of Single–Wall Carbon Nanotubes from Metal Particles*. Chemical Physics Letters 296 (1998) 195–202, no month*.

Cassell et al., *Large Scale CVD Synthesis of Single–Walled Carbon Nanotubes*, J. Phys. Chem. B (1999) 103, 6484–6492, no month*.

Thess et al., *Crystalline Ropes of Metallic Carbon Nanotubes*, Science 273, (1996) 483–487, no month*.

Journet et al., *Large–Scale Production of Single–Walled Carbon Nanotubes by the Electric–Arc Technique*, Nature 388 (1997) 756–758, no month*.

Kovalev et al., *Strucutre of a Beam–Driven RF Discharge in a Gas Flow*. Sov. J. Plasma Phys. 11(7), 1985, 515–519, no month*.

Kroto et al., *Can. Buckminsterfullerene*. Nature vol. 318, No. 6042, pp. 162–163, no date, no month*.

Iijima, *Helical Microtubules of Graphitic Carbon*, Nature vol. 354, pp. 56–58 (Nov.7, 1991).

Yakobson et al., *Fullerene Nanotubes: C1,000,000 and Beyond*. American Scientist vol. 85, pp. 824–337 (1997), no month*.

Bethune et al., *Cobalt–Catalysed Growth of Carbon Nanotubes with Single–Atomic–Layer Walls* Nature vol. 363, pp. 605–607 (Jun. 17, 1993).

Dai, *Controlling Nanotube Growth*, Physics World, pp. 43–47 (Jun. 2000).

Park, *Nonequilibrium Hypersonic Aerothermodynamics*. John Wiley & Sons. ISBN 0–471–51093–9 (1990), no month*.

Urban et al., *Treanor Pumping of CO Initiated by CO Laser Excitation*. Chemical Physics 130 pp. 389–399 (1989), no month*.

Adamovich et al., *Vibrationally Stimulated Ionization of Carbon Monoxide in Optical Pumping Experiments*. Chemical Physics. 173, pp. 491–504. (1993), no month*.

Rich et al., *C2 and CN Formation by Optical Pumping of COAr and CoN2 Ar Mixtures at Room Temperature*, Chemical Physics 44, pp. 53–64 (1979), no month*.

Berman et al., *13C Isotope Seperation by Laser Excitation of CO*, Proceedings of the International Conference on Lasers, pp. 265–269 (1980), no month*.

Anex et al., *Transfer and Storage of Vibrational Energy in Liquids: Collisional Up–Pumping of Carbon Monoxide in Liquid Argon*, J. Phys. Chem. 90, pp. 1604–1610(1986), no month*.

\* cited by examiner

US 6,855,301 B1

SYNTHESIS METHOD FOR PRODUCING CARBON CLUSTERS AND STRUCTURED CARBON CLUSTERS PRODUCED THEREBY

This application is a division of U.S. application Ser. No. 09/692,968, filed Oct. 20, 2000, now abandoned, which is incorporated herein by reference.

This invention was made with U.S. Government support under Contract Grant Nos. F49620-99-1-0119 and F49620-97-1-0312 through The Office of Scientific Research of the United States Air Force. Accordingly, the U.S. Government has certain rights in this invention.

TECHNICAL FIELD OF THE INVENTION

The present invention is in the field of carbon cluster production. This invention relates to the synthesis of structured carbon clusters, and carbon cluster structures that may be produced by the synthesis. Specifically, the present invention relates to a system and method for producing large quantities of carbon clusters, including single-walled carbon nanotubes.

BACKGROUND OF THE INVENTION

The existence of a new unique form of carbon, the fullerene, was first demonstrated by Kroto et al. in 1985 [1]. Tubular structures of carbon, closely related to the fullerene (called carbon nanotubes) were first synthesized in an arc discharge by S. Iijima[2]. Carbon nanotubes can be synthesized in two forms, multi-walled and single-walled tubes. Particularly, single-walled carbon nanotubes have many unique and potentially useful physical and chemical properties [3].

Several methods for the production of carbon nanotubes and fullerenes have been successfully demonstrated in the past decade. The principle methods used to obtain desired carbon structures include arc discharges [4,5], laser ablation of graphite targets [6], and chemical vapor deposition [7]. These techniques are capable of producing milligram to gram quantities of particularly single-walled carbon nanotubes in a few hours. However, many potential applications of these nanotubes require much larger quantities. So far no process has been described that can produce industrial scale quantities of nanotubes.

A particular disadvantage of the aforementioned techniques lies in the fact that they cannot be continuously operated. Smalley et al. [8] recently developed a continuous flow-through process which is possibly capable of scale-up to large quantities. Carbon monoxide is heated in an oven to temperatures of around 1000° C. to drive the CO disproportionation to form carbon atoms. The formation of carbon clusters, in particular single-walled carbon nanotubes, is enhanced by adding gaseous iron pentacarbonyl to the gas mixture in the oven.

Since their discovery in the mid-80's, much effort has been put into the study of fullerenes. Although many potential applications have been proposed, these fullerenes have not lived up to their potential. Interest has since shifted to carbon nanotubes, particularly single-walled carbon nanotubes.

Initial tests suggest that carbon nanotubes may be promising materials for hydrogen storage, a property of great interest to the automobile industry in the search for cleaner running automobiles. The use of fuel cells in automobiles is presently inhibited by the lack of an effective hydrogen storage medium. The use of carbon nanotubes in this field is therefore being extensively explored.

Another potential application involves use of carbon nanotubes as electron emitters in field emission displays. Liquid crystal displays currently dominate the market for flat panel displays. Their major disadvantage, however, lies in the expense of production and the comparatively poor quality of display. Field emission displays are expected to be far superior, with nanotubes providing cheaper electron emitter production.

Finally, nanotubes demonstrate an opportunity for the synthesis of carbon containing materials with very promising characteristics such as extreme hardness, low density, and variable conductivity. There are also interesting applications for such light materials in the aerospace, automobile or sports article industries.

A present disadvantage for the industrial use of carbon nanotubes in the applications presented above is the fact that, to date, a system for synthesizing large quantities of nanotubes has not been found. Most techniques operate on a gram per day basis and require subsequent cleaning of the material, leading to prices of about $2000 per gram for 85% pure material.

It is therefore an object of the present invention to develop a system and method for cheaply and efficiently producing industrial quantities of single-walled carbon nanotubes.

Although described with respect to the field of carbon synthesis, it will be appreciated that similar advantages may obtain in other applications of the present invention. Such advantages may become apparent to one of ordinary skill in the art in light of the present disclosure or through practice of the invention.

SUMMARY OF THE INVENTION

The present invention presents a much more efficient technique to drive the reaction, typically a disproportionation reaction, toward the carbon product. This technique also leads to the formation of more advanced carbon nanotube materials with a highly aligned structure. The carbon containing material referred to herein as a carbon precursor material is subjected to a non-equilibrium excitation of its vibrational energy modes. This process does not add energy into other energy modes the excitation of which are either not useful to drive the reaction, or may be even counterproductive for the overall synthesis process, such as may occur from heating the reactants. This same energy increase may also be harmful or otherwise disadvantageous where deposition of the carbon clusters onto a fragile substrate (i.e., one unable to withstand prior art heating processes) is desired.

Non-equilibrium vibrational kinetics of diatomic and small polyatomic molecules has been studied for many years, because of its importance in gas discharge plasmas, molecular gas lasers, upper atmosphere chemistry, and gas dynamic flows [9, 10].

Very high-energy vibrational quantum states of some molecular gases can be substantially populated under specific non-equilibrium conditions by the mechanism of vibration-vibration (V-V) exchange pumping. Quanta of vibrational energy are exchanged during inelastic collisions between the gas molecules. This kinetic mechanism automatically occurs in high pressure, collision-dominated gases wherever a sufficiently large amount of energy can be put into the vibrational mode of the molecular gas, while, simultaneously, a relatively low gas kinetic (translational/rotational mode) temperature is maintained. The vibrational energy state population distribution in such cases is highly non-Boltzmann and characterized by relative overpopulation of the higher vibrational quantum states with respect to the lowest vibrational states.

The variety of systems used to sustain a strong vibrational disequilibrium in gases include rapid expansion of gases in supersonic nozzles, excitation of molecular vibrations in electric discharges, and optical pumping by laser radiation absorption.

In a preferred embodiment, the optical pumping of carbon monoxide by a CO laser has been demonstrated for several chemical and engineering applications described below. However, it has not been previously used for the synthesis of fullerenes and carbon nanotubes.

Mixtures of CO—Ar and CO—He at pressures ranging from 10 to 100 Torr have been optically pumped by relatively low power CO lasers with power of about 10 Watts at room temperature [11, 12, 13]. Gaseous mixtures of CO/Ar and $CO/N_2$ /Ar of pressures up to several atmospheres have been optically pumped at room temperature with a high power supersonic CO laser [14].

In the work by Rich et al. [14] it is reported that the $C_2$ product formed in the gas phase is enriched in the $C^{13}$ isotope by as much as 20%. The same authors have shown separately [15] that similar enrichments of about 15% occur in the isotope containing products $C_2$, $CO_2$, and $C_3O_2$.

In the experiment by Anex et al. [16], isotopically pure CO (88% $C^{13}O^{16}$ and 12% $C^{13}O^{18}$) in liquid argon was successfully vibrationally excited up to about level v=20 by irradiating the liquid mixture with beam energy from a multi-line CO laser operating on its lowest vibrational transitions. This experiment demonstrates that heavier isotope species can be vibrationally excited in collisions with the CO isotope that can be accessed directly with the laser. The optical pumping of CO with a CO laser is also known for producing diamond films [17].

Accordingly, the present invention includes a synthesis of structured carbon clusters. Specifically, the present invention relates to a system and method for producing large quantities of carbon clusters of several geometries, including single-walled carbon nanotubes.

The present disclosure also describes machines and instruments for practicing the invention. The invention may also be practiced using upgraded, repaired or retrofitted existing machines or instruments, and using variations of methods and components known in the art. The present invention may be practiced using methods and apparatus described in co-pending patent application by Rich et al. entitled "Method And Apparatus For Sustaining Stable High-Pressure Non-Equilibrium Molecular Plasmas," which is hereby incorporated herein by reference.

The present invention also includes compositions of matter including aligned carbon nanotubes and bundles of aligned carbon nanotubes.

The present invention includes an array of carbon nanotubes, each nanotube having a longitudinal axis. The nanotubes are produced such that they form into an array such that the longitudinal axes of all nanotubes in the array are substantially parallel. The array may be a two-dimensional array or a three-dimensional array.

The invention also includes a bundle of carbon nanotubes, the bundle comprising a plurality of carbon nanotubes, each of the carbon nanotubes having a longitudinal axis, the plurality of carbon nanotubes being aligned in the bundle such that the longitudinal axes are substantially parallel. The bundle of carbon nanotubes may include single-walled carbon nanotubes and/or multi-walled carbon nanotubes.

The invention also includes a plurality of bundles of carbon nanotubes according to the invention wherein each of the bundles has a longitudinal axis, and the bundles being aligned such that the longitudinal axes are substantially parallel. The plurality of bundles of carbon nanotubes may be in the form of a flat array of the bundles or a three-dimensional pack array of the bundles.

A typical bundle of single-walled carbon nanotubes is shown in FIG. 1. Several of such bundles in an array are shown in FIG. 2. Alternatively, such arrays may comprise of multi-walled carbon nanotubes, which have several concentric layers of graphite as their walls.

Several of these bundles are aligned into a plurality such that the longitudinal axes of the individual bundles are substantially parallel to each other. Several of the bundles are aligned in a sheet such that the longitudinal axes of the individual bundles are substantially parallel to each other and a substantially two dimensional plane is formed. A transmission electron micrograph of such a sheet of bundles is shown in FIG. 3.

Aligning individual nanotubes in such a manner is of great importance for forming macroscopic nanotube materials out of the individual nanotubes.

The present invention thus provides a process for making large quantities of carbon molecular clusters from a carbon containing feedstock using a non-equilibrium synthesis process.

The present invention also includes a method of preparing carbon molecular clusters. The method generally involves (a) providing a feedstock comprising at least one carbon precursor material having chemical bonds and being capable of undergoing a reaction so as to provide carbon atoms for the formation of the carbon molecular clusters; (b) subjecting the carbon precursor material to a non-equilibrium excitation of the vibrational modes of the chemical bonds so as to cause the carbon precursor material to undergo a reaction so as to provide carbon capable of forming carbon molecular clusters; and (c) allowing the carbon formed thereby to come into contact with a catalyst so as to form molecular clusters. This process can be operated continuously.

In order to drive the reaction, such as a disproportionation reaction, one would usually heat the feedstock to put energy into the chemical bonds of the carbon precursor that have to be broken in the disproportionation reaction. Heating of the feedstock is a very non-selective process that puts energy into all energy modes of the carbon precursor. Relatively high temperatures, required for a fast disproportionation reaction, are usually counterproductive for the formation of highly structured carbon molecular clusters from the carbon atoms provided by the disproportionation reaction. In the present invention, the carbon precursor is subjected to a selective excitation of only its vibrational energy mode to provide the energy required for the disproportionation reaction. This produces a non-equilibrium between the different energy modes (vibration, translation, rotation, electronic excitation) of the carbon precursor. Most importantly, the vibrational energy mode of the carbon precursor can be excited essentially without necessarily increasing the temperature of the feedstock. The temperature of the feedstock can be selected independently of the vibrational excitation to provide optimum conditions for the formation of carbon molecular clusters from the carbon atoms provided by the disproportionation reaction. The non-equilibrium between the vibrational energy mode of the carbon precursor and the other degrees of freedom (mainly temperature) allows for independent optimization of the reaction, such as a disproportionation reaction, and the subsequent formation of the carbon molecular clusters/nanotubes, and therefore greatly improves the overall production rate compared to an equilibrium approach.

This excitation is done without substantial increase, i.e., without equilibrium-proportionate increase, in the translational energy of the reaction system. This will typically be done by maintaining the translational mode temperature at any value or range of values in the range of from about 100 to about 3000 K, preferably below 1500 K, and most preferably less than 570 K (i.e., about 200° C.). This may be done by use of buffer gas(es) and/or, where the feedstock is in the form of a fluid, and the flow of the fluid provides convective cooling sufficient to maintain the translational temperature of the reactant gas(es).

The carbon atoms are maintained at sufficient temperature for sufficient time to allow formation of the carbon clusters or nanotubes.

In the method, the carbon precursor material(s) may have any type of chemical bond(s) and being capable of undergoing a reaction, such as for example a disproportionation reaction, so as to form carbon further capable of forming molecular clusters. Preferably, the carbon precursor is in a gaseous phase, such as carbon monoxide gas. Carbon monoxide gas is also very suitable for the subject non-equilibrium synthesis method, since it can easily be prepared into a very strong vibrational non-equilibrium [13 and references therein].

The carbon generated in the reaction brought about by vibrational excitation may be in the form of a free carbon atoms, carbon molecules (such as $C_2$, $C_3$ and $C_4$) or precursor carbon molecular cluster. The carbon atoms provided by the reaction, such as a disproportionation reaction, may be free carbon atoms, or free carbon molecules that in a separate step form the carbon molecular clusters. However, it is also possible that the reaction takes place on the carbon molecular cluster while it is in the process of being formed. Third, the reaction may occur on a catalyst, adding the carbon atoms provided by the reaction directly to the carbon molecular cluster or the catalyst. Accordingly, the invention is not limited to any particular mechanism of formation of the molecular clusters.

These various species in turn lead to the product molecular cluster, fullerene or carbon nanotube.

The mixture also includes at least one catalytic material capable of catalyzing the formation of carbon nanotubes from the carbon. The catalyst can be used either to catalyze the disproportionation reaction and/or to catalyze the formation of the desired carbon molecular clusters. The catalytic material may be any material capable of providing the required catalytic function, i.e., providing a basis for formation of the carbon clusters/nanotubes (such as in the form of free metal ions or appropriate growth surfaces). The catalyst may be introduced or formed in any appropriate way, such as being included into, or formed from, the feedstock. A catalyst may also be formed from a catalyst precursor within and/or parallel to the actual carbon molecular cluster synthesis process.

Catalysts can be introduced in the solid, liquid, or gaseous phase. Examples of gas phase catalysts include iron pentacarbonyl, nickel tetracarbonyl, and mixtures thereof. The catalyst may also be a solid state catalyst, such as a solid state nanochannel membrane, fabricated separately.

Possible catalysts may be, but are not limited to, gas phase iron clusters formed from gaseous iron pentacarbonyl within the non-equilibrium synthesis process or solid state nanochannel membranes fabricated separately.

Preparing and maintaining a vibrational non-equilibrium, as described in accordance with the present invention, can, under some conditions, also lead to undesirable heating of the feedstock. If the extent of heating is undesirably high for the synthesis process, the addition of at least one buffer gas to the feedstock is possible to decrease the temperature of the feedstock. The buffer gas(es) decrease the temperature of the feedstock by increasing its heat capacity and/or its thermal conductivity. The use of buffer gas(es) is not limited to controlling the temperature of the feedstock but can also be used for other purposes like controlling diffusion and/or convection in the feedstock. Possible buffer gases are, but are not limited to, argon and helium.

The buffer gas(es) may be any gas or mixture of gases capable of providing the buffering function. An example of a suitable buffer gas may be those selected from the group consisting of argon, helium and mixtures thereof. The buffer gas may be present in an amount sufficient to maintain the translational temperature of the plasma produced by excitation at any desired temperature, such as any value or range of values in the range of from about 100 to about 3000 K, preferably below 1500 K, and most preferably below about 200 degrees C.

Furthermore, the flow rate of the feedstock can be varied to change the amount of heat removal from the process through convective cooling.

The excitation may be brought about by any appropriate non-equilibrium excitation method such as laser irradiation, electric discharge, supersonic expansion or combinations thereof. An example of a non-equilibrium excitation method is optical pumping with a carbon monoxide laser.

The mixture may additionally comprise at least one additional carbon-containing molecule, such as methane, that is capable as acting as secondary carbon precursors (i.e., those that may be energized by the excitation of the primary carbon precursor and may themselves form carbon).

Also included in the present invention is a method of preparing carbon molecular clusters from carbon monoxide. In this method, the vibrational energy mode of the carbon monoxide is excited in a fluid reaction mixture, thereby causing the carbon monoxide to undergo a disproportionation reaction so as to form carbon atoms. The translational mode temperature of the carbon monoxide is maintained at a selected value in the ranges given above. The carbon monoxide is maintained at that vibrational mode energy and translational mode temperature for sufficient time so as to allow the formation of carbon molecular clusters. The partial pressure of the carbon monoxide may be at values below 1 atmosphere, but may also be at or above 1 atmosphere.

In a preferred embodiment, the fluid reaction mixture may include at least one buffer gas such as argon, and a catalyst such as a metal carbonyl, like iron pentacarbonyl or nickel tetracarbonyl. The mixture may also contain an additional carbon-containing molecule, such as methane. Laser irradiation, electric discharge, or supersonic expansion may provide the vibrational excitation. The buffer gas may be present in an amount sufficient to maintain the translational temperature of the reactant gases produced by excitation below 200 degrees C. or even below 100 degrees C. (this temperature may even extend as low as room temperature or even to the freezing point). The gas flow may also provide convective cooling sufficient to maintain the translational temperature of the reactant gases produced by excitation below 200 degrees C. or even below 100 degrees C. The vibrational excitation may be accomplished by laser radiation created by a carbon monoxide gas laser. The carbon atoms produced by the disproportionation reaction may become bound to the catalyst, or may be formed as bound to a molecule cluster.

The vibrational excitation may be used to provide a spatially localized synthesis region, and may produce structured regions of carbon cluster formations. This may be done through excitation provided by laser radiation.

The carbon molecular clusters may form into an arrangement of single-walled carbon nanotubes, multi-walled carbon nanotubes, or fullerenes.

The method of the present invention also includes using an applied DC field to the plasma produced by the vibrational excitation. A D.C. electric field can be used to enhance the synthesis process in different ways. The enhancement can be an enhancement of the purity of the carbon molecular clusters by, for example, separating undesired products from the desired carbon molecular clusters due to their different properties in the D.C. electric field. Another enhancement can be the orientation of the carbon molecular cluster formed in the D.C. electric field. This allows enhancement including an alignment of the carbon molecular clusters and nanotubes, as well as purification of the carbon molecular clusters and nanotubes.

Carbon molecular clusters and nanotubes may be isotopically enriched toward heavier carbon isotopes compared to the isotopic composition of the carbon precursor material through the non-equilibrium method (DC field is not necessary for this).

The method of the present invention may optionally be carried out using a feedstock that additionally comprises at least one precursor material having chemical bonds and being capable of undergoing a reaction so as to provide constituent atoms other than carbon (with or without carbon) for the formation of the molecular clusters containing these constituent atoms along with carbon from the same or other materials in the feedstock. Examples of these optional materials include one or more materials selected from the group consisting of BN, $BC_2N$, or $BC_3$ precursors or a mixture thereof.

Thus, the present invention may also provide carbon molecular clusters that are not limited to pure carbon structures. Similar structures to pure carbon molecular clusters can be clusters in which at least one, but possibly many or even all pairs of carbon atoms (CC) are substituted by boron nitride (BN). Such structures may be boron nitride nanotubes. Also triplets, quadruplets, or bigger carbon multiplets can be substituted by chemically similar molecules like, for example, $BC_2N$, or $BC_3$. In order to produce these not purely carbon containing molecular clusters one or multiple carbon precursor materials may be substituted by suitable precursor materials such as BN, $BC_2N$, or $BC_3$ precursors.

The present invention also includes a method of preparing molecular clusters comprising the steps: (a) providing a feedstock comprising at least one precursor material having chemical bonds and being capable of undergoing a reaction so as to provide constituent atoms for the formation of the molecular clusters; (b) subjecting the precursor material to a non-equilibrium excitation of the vibrational modes of the chemical bonds so as to cause the precursor material to undergo a reaction so as to provide constituent atoms other than carbon; and (b) allowing the constituent atoms to come into contact with a catalyst so as to form molecular clusters.

The constituent atoms may be from any precursor material(s), and may include, for example, those selected from the group consisting of BN, $BC_2N$, or $BC_3$ precursors or a mixture thereof.

This method may be used to produce molecular clusters such as boron nitride clusters or nanotubes or carbon-boron-nitrogen clusters or nanotubes.

One of the advantages of the method of the present invention is that it may be used to deposit molecular clusters or nanotubes onto a substrate, including those substrates that cannot tolerate the temperatures or other reaction conditions necessarily attendant to thermal equilibrium excitation (such as the use of furnaces above 1000 degrees C.). Examples of substrates may include any metal, mineral, glass and plastic materials appropriate to the desired application of the carbon clusters. Examples of relatively weak or non-resilient materials may include polymeric films or thin metals. These materials may be such that they have chemical make-up, physical properties or surfaces that one would seek to be preserve for deposition of the cluster/nanotube material(s). For example, a thin polymeric material or metal, or a material with a polished or specially prepared surface may be brought sufficiently close to the excited carbon to allow deposition without melting, decomposing or chemically altering the constituent material or its surface.

Accordingly, the present invention includes a method as set forth above additionally comprising the step of depositing the carbon molecular clusters onto a substrate, the substrate having a chemical or physical characteristic unable to withstand the conditions necessary to bring about the excitation through equilibrium excitation.

DETAILED DESCRIPTION OF THE PREFERRED EMBODIMENT(S)

In accordance with the foregoing summary, the following presents a detailed description of the preferred embodiment of the invention that is currently considered to be the best mode.

Methods of the present invention for the synthesis of advanced carbon compounds such as carbon nanotubes are based on ordered molecular clusters. These methods create new types of chemical reactors capable of producing large amounts of carbon atoms at low and variable temperature. In these reactors, large amounts of energy are stored in the vibrational mode of carbon-containing reactant molecules by use of laser irradiation, electric discharges, and supersonic expansions. A preferred embodiment comprises the vibrational excitation of carbon monoxide molecules, in the gas phase, using a carbon monoxide laser.

Figure 5:
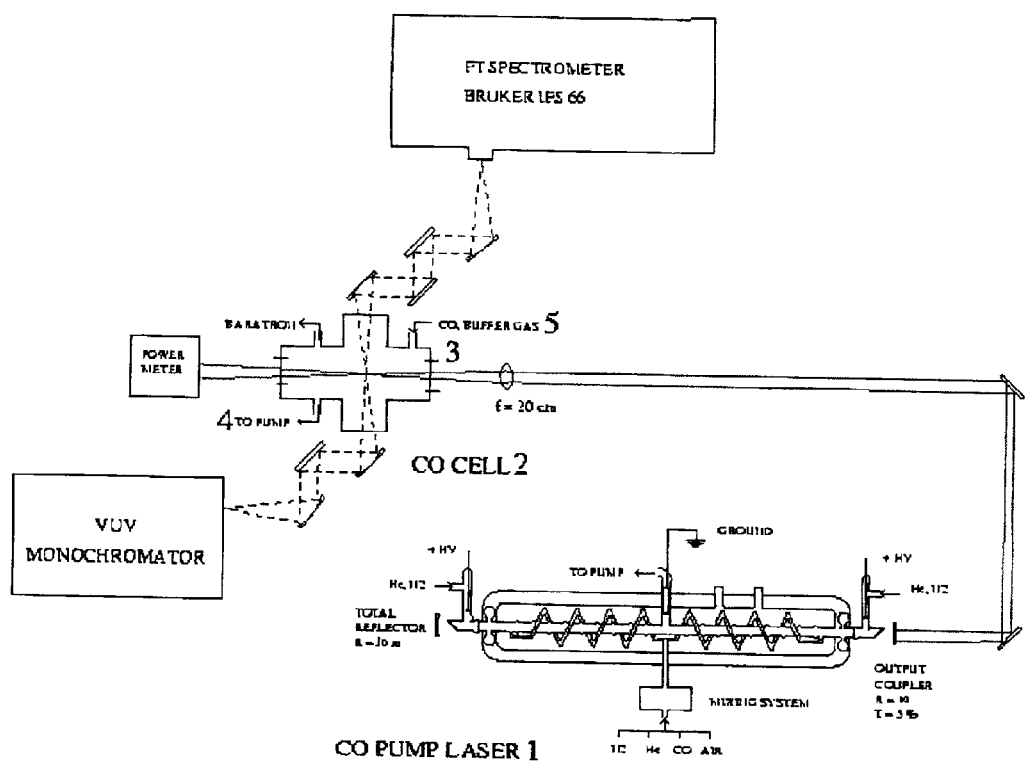
FIG. 5 is a schematic diagram of a laser excitation apparatus in accordance with one embodiment of the present invention.

A preferred embodiment comprises the vibrational excitation of gaseous carbon monoxide (CO) reactant using a carbon monoxide laser 1 as shown in the experimental setup shown in FIG. 5.

Gaseous carbon monoxide flowing through an optical absorption cell 2 is vibrationally excited by resonant absorption of CO laser radiation, as shown in FIG. 5 experimental setup. The CO laser 1 is preferably a very efficient multi-line CO laser, providing infrared radiation at multiple wavelengths around 5 µm. In this excitation process, typically the lowest ~10 vibrational quantum levels of the CO molecules are directly populated by the CO laser radiation.

Figure 4:
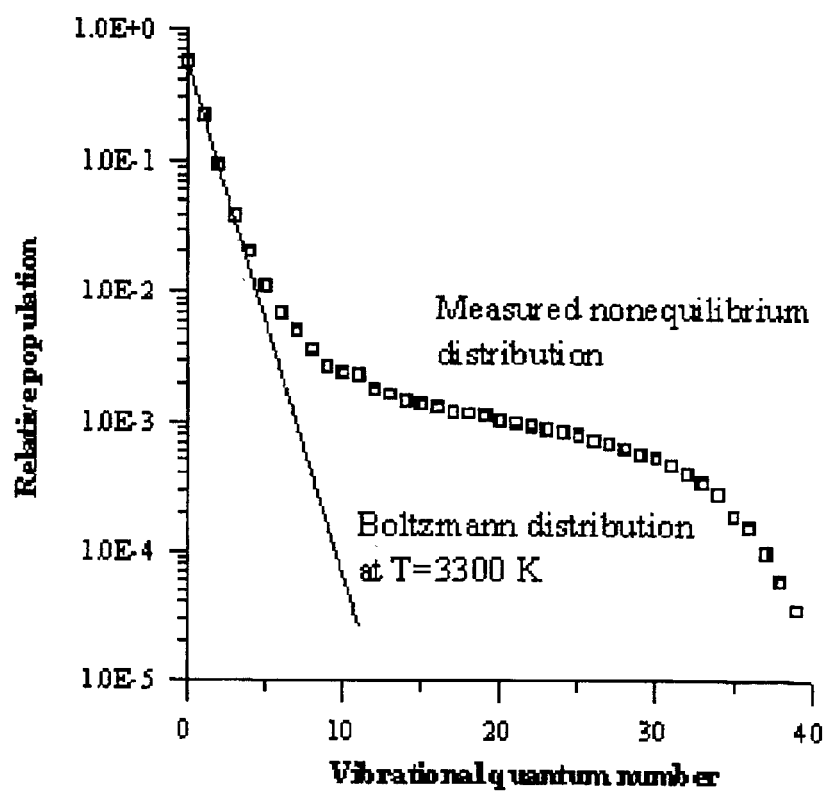
FIG. 4 is a plot of the relative population distribution of vibrationally excited carbon monoxide in accordance with one embodiment of the present invention.

Vibration-vibration exchange collisions between the carbon monoxide molecules lead to a highly non-equilibrium energy distributon in the carbon monoxide with significant population of vibrational quantum levels v as high as v=40 [13]. A typical, experimentally measured distribution function is shown in FIG. 4.

In a collision of two highly excited CO molecules, the total energy of the collision partners is high enough to drive the carbon monoxide disproportionation reaction $$CO+CO \rightarrow C+CO_2.$$

This provides the carbon atoms used for the formation of the carbon molecular clusters.

Driving the disproportionation reaction at the same rate, i.e., providing the same number of molecules with the necessary energy for the disproportionation reaction, by simply heating the CO gas (an equilibrium process) would require a temperature of several ten thousand Kelvin. At such a high temperature the formation of carbon molecular clusters from the C atoms produced would be impossible. Even the strongest bound carbon structures like diamond or carbon nanotubes disintegrate at these temperatures. Obviously in an equilibrium process the disproportionation reaction can only be weakly driven to avoid temperatures that prohibit the formation of carbon molecular clusters, thus strongly limiting the overall production rate of carbon molecular clusters. On the other hand, the non-equilibrium vibrational excitation described in accordance with the present invention provides the energy necessary to efficiently drive the disproportionation reaction without limiting the range of the reactant temperature at all. Thus, it is possible to select the temperature to provide optimum conditions for the formation of the carbon molecular clusters from the carbon provided by the disproportionation reaction, and the deposition onto a substrate as desired.

Relatively small amounts of excess heat are produced by the vibration-vibration pump process and by vibration-translation relaxation of the CO molecules. This heat can, if desired, be removed from the reaction cell by convective cooling of the CO gas, increasing the heat capacity and/or thermal conductivity of the feedstock by adding buffer gases like argon or helium, or by increasing the gas flow rate in the reaction cell. Strong vibrational non-equilibrium in CO has already been demonstrated at temperatures between 100 K and 1500 K.

In a currently preferred embodiment, the radiation of a laser is used to vibrationally excite gaseous CO molecules. The laser can be any appropriate laser producing radiation that can excite the vibrational energy mode of CO. A preferable laser is a multi-line CO laser 1, producing infrared radiation at multiple wavelengths around 5 µm. A multi-line CO laser can be very efficient, converting up to 30% of wall plug electric power into laser radiation. Furthermore, CO lasers have been shown to be scalable to megawatts of continuous wave (c.w.) laser power, making the process described here scalable to industrial scale production.

The laser radiation is directed into a reaction cell 2, containing the gaseous CO molecules. The reaction cell may be any appropriate container, such as a Pyrex glass tube, equipped with ports 3 granting access to the laser radiation.

Preferably the reaction cell may be connected to a pump system 4 to remove gaseous reaction products and a gas delivery system 5 to replenish the reactants. The pump and the gas delivery system may also be used to maintain a constant flow of reactants into the reaction cell and reaction products out of the reaction cell.

An appropriate flow velocity in the cell may also be used to provide flow-convective cooling of the cell gases. Further cooling may be provided by adding at least one buffer gas to increase the heat capacity and/or the thermal conductivity of the gas mixture. A buffer gas may also be used to purge the ports 3 granting laser access in order to prevent the build up of solid reaction products on the ports.

To enhance the disproportionation reaction and/or to enhance the formation of specific carbon molecular clusters, a catalyst is used. In a currently preferred embodiment, gaseous iron pentacarbonyl is used to provide the iron to form iron clusters that act as a catalyst. CO gas delivered in steel cylinders commonly contains significant amounts of iron pentacarbonyl that may be used to provide a feedstock and a catalyst simultaneously. The relative amount of iron pentacarbonyl in the reactant mixture can be reduced by using some of the CO from iron pentacarbonyl free aluminum cylinders.

In a preferred embodiment, the iron pentacarbonyl is dissociated by the same CO laser radiation that vibrationally excites the CO.

It is preferred that the non-equilibrium synthesis process is used to produce single-walled carbon nanotubes. In one preferred method, carbon monoxide gas mixed with small amounts (<0.1%) of gaseous iron pentacarbonyl is introduced into the reaction cell 2, flowing at velocities in the range of 0.01–1 m/sec. The total gas pressure is, typically, about 100 Torr, consisting of ~50 Torr of CO and ~50 Torr of argon buffer gas. The pressure may be varied depending upon the desire to increase the reaction rate. The CO in the reaction cell absorbs laser radiation from a multi-line CO laser 1 operating at 15 W c.w. power by resonance absorption of the radiation into its lowest (i.e., ~10) vibrational quantum states. The vibrational mode energy is subsequently redistributed into higher vibrational levels by inelastic collisions among the CO molecules (so-called anharmonic vibration-to-vibration up-pumping). FIG. 4 shows a typical measured distribution of populations among the CO vibrational quantum levels, when the reactant is prepared in this manner. The measured distribution is compared with a thermal equilibrium distribution at 3300 K. The extreme departure from a thermal equilibrium (Boltzmann) distribution of vibrational level populations is evident. Vibrational levels extending as high as v=40 are substantially populated; the energy of these levels is ~8 eV, or ~185 kcal/mol. The translational/rotational energy modes of the CO, on the other hand, remain in thermal equilibrium at a relatively low temperature. It must be emphasized that this is in no way a laser-induced breakdown, laser ablation, or laser pyrolysis process. A key feature of the non-equilibrium method is that it is possible to drive the disproportionation reaction very much toward the C product, but at low gas kinetic temperatures. For example, the gas phase activation energy of the disproportionation reaction is around 130 kcal/mol. The population of vibrational states of CO at levels equal to this energy in the non-equilibrium distribution of FIG. 4 would require an equilibrium temperature of nearly 12,000 K. Since vibrational mode activation substantially contributes to establishing the reactive complex in the disproportionation, the excitation process selectively drives the reaction. The enhancement is large even for lower activation energies such as the ~90 kcal/mol activation energy required to drive the disproportionation reaction on a FeO catalytic surface, or on other catalytic surfaces. In the present carbon nanotube synthesis method, free iron atoms may be produced by CO laser dissociation of iron pentacarbonyl, and small iron clusters may agglomerate. Vibrationally excited CO then reacts on the surface of the clusters forming the nanotubes.

Figure 1:
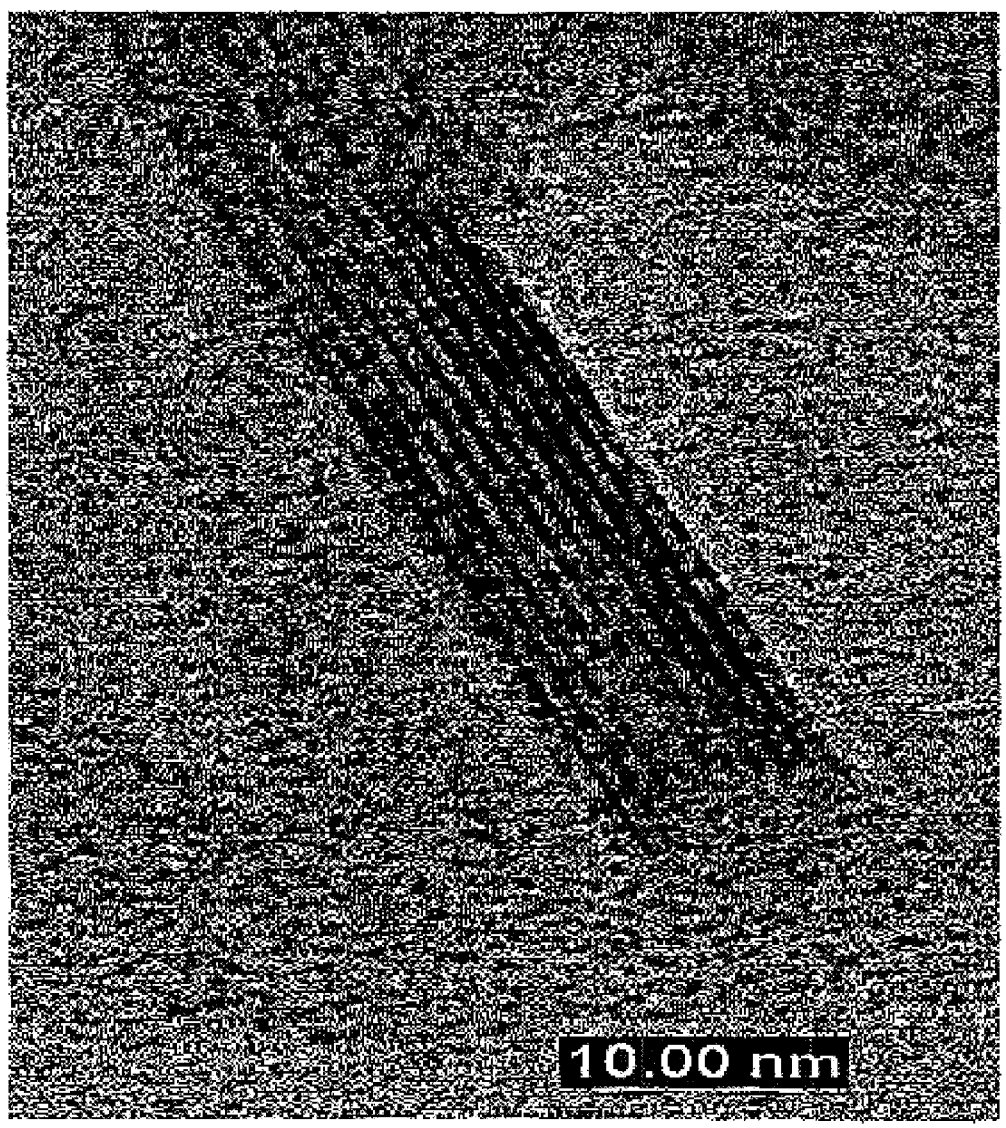
FIG. 1 is a transmission electron micrograph of a bundle of single-walled carbon nanotubes.
Figure 2:
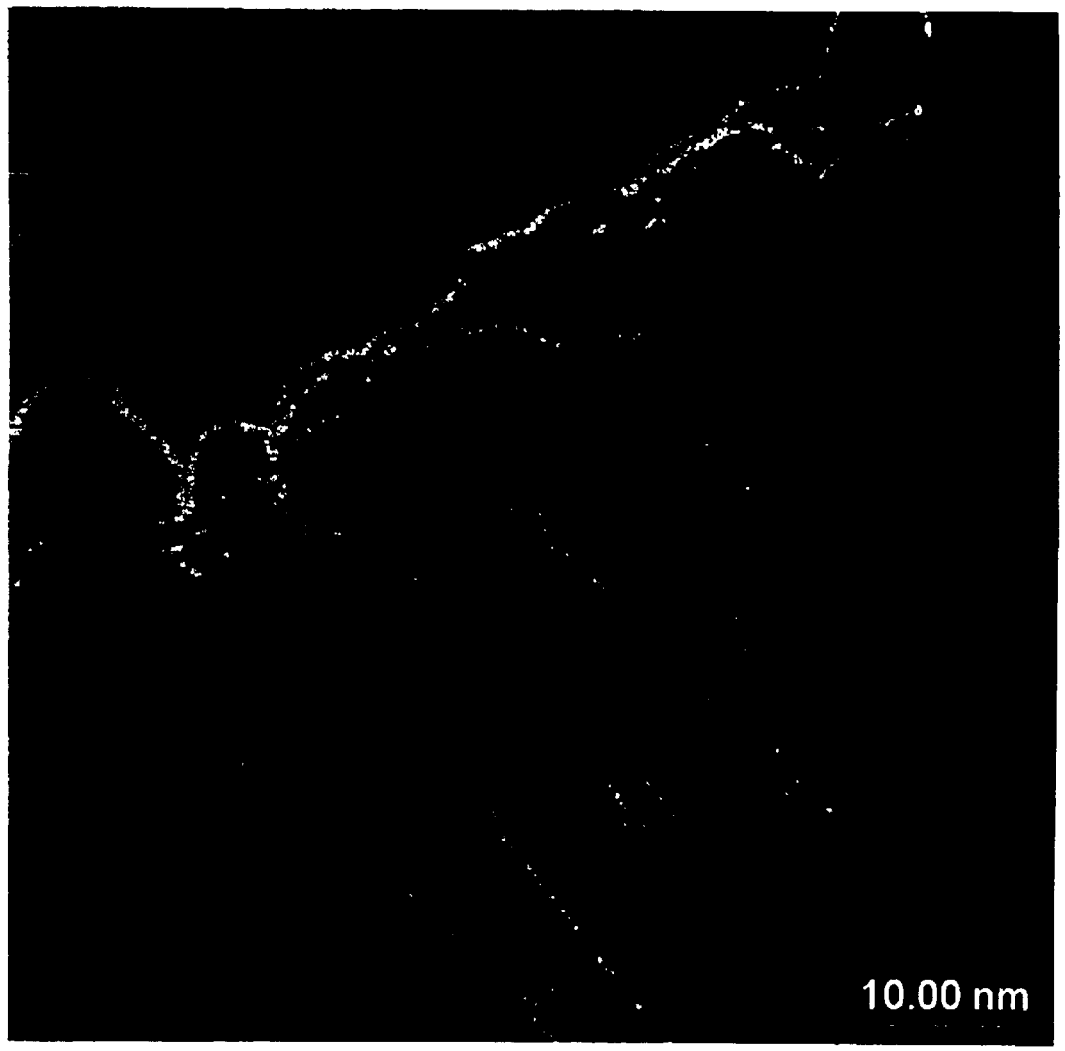
FIG. 2 is a transmission electron micrograph of several bundles of single-walled carbon nanotubes.
Figure 3:
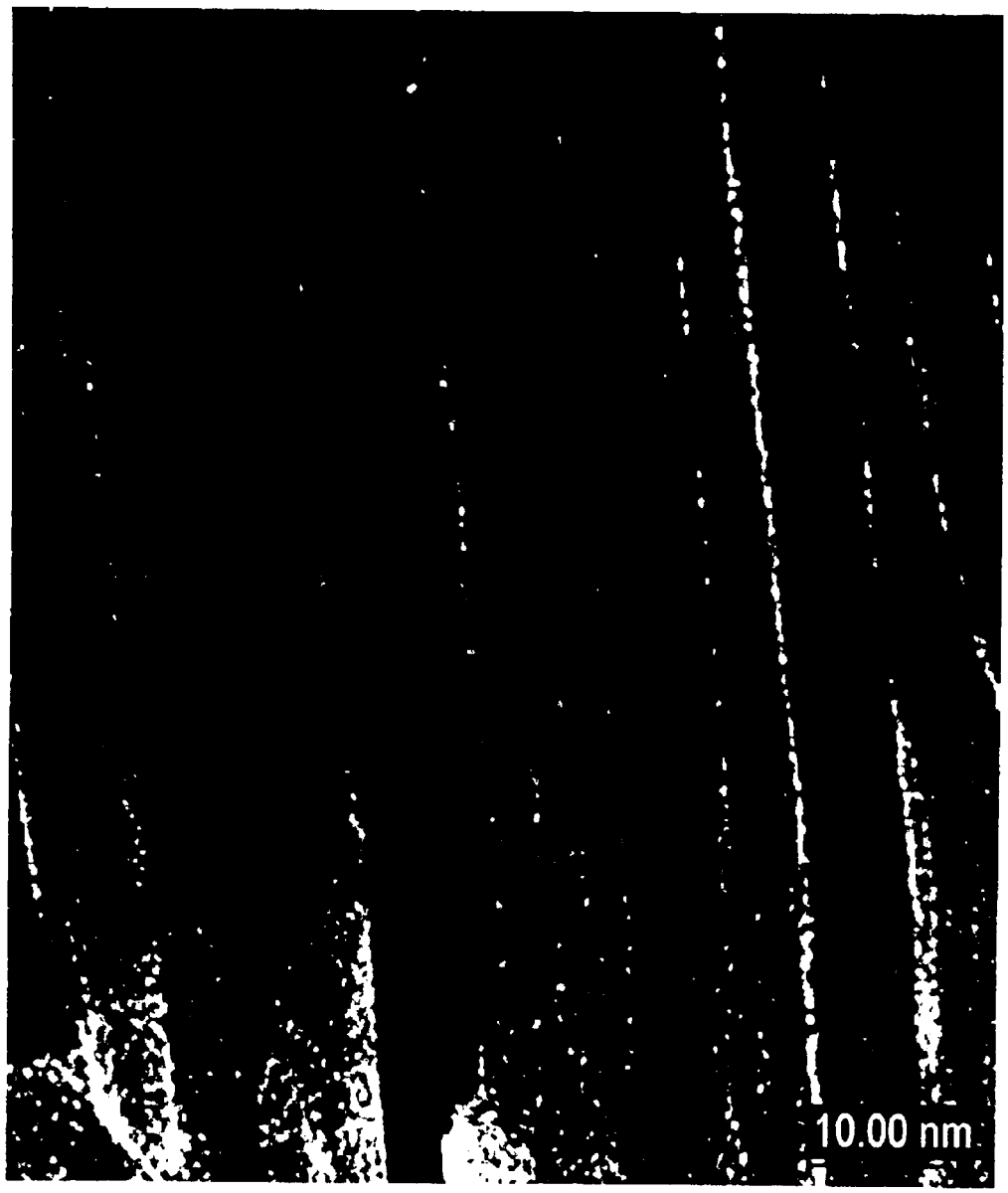
FIG. 3 is a transmission electron micrograph of a sheet of many aligned bundles of single-walled carbon nanotubes.

For analysis by transmission electron microscopy (TEM) and scanning electron microscopy (SEM), the carbonaceous products may be collected on substrate surfaces, such as TEM grids or silicon wafers, at different locations in the reaction cell during runs of, typically, 10 to 90 minute duration. For certain conditions of flow velocity, iron pentacarbonyl concentration, and substrate location relatively pure nanotube material is gathered. The end product is a series of long bundles, consisting of tens of closely packed nanotubes with diameters of the order of 1 nm each. Typical TEM pictures of these pluralities are shown in FIGS. 1 and 2. The bundles often appear to be oriented in a preferred direction forming pack pluralities and sheet pluralities of aligned bundles. A transmission electron micrograph of a sheet of such aligned bundles is given in FIG. 3. For different conditions, single strands of nanotubes may be produced together with higher amounts of amorphous carbon and other nanoparticles.

In a reaction cell with a volume of 200 cm$^3$, the material deposited in a two-hour run by a laser excited plasma of about 1 cm$^3$, using 15 W laser power, and a CO partial pressure of 50 Torr in 50 Torr of argon buffer gas was collected and weighed. This measurement gives a total deposition rate of 10–20 mg/hr. TEM analysis of the product shows approximately 70% pure nanotube material. This indication is encouraging, since this estimate is comparable to that of prior processes [8], although, and most critically, the present process was conducted at reactant densities of considerably less than 10% of that of prior processes. The process of the present invention already demonstrates clear advantages that can lead to the production of industrial scale quantities of single-walled carbon nanotubes. With small amounts of power and a compact flow apparatus, the method of the present invention has already demonstrated synthesis of single-walled carbon nanotubes at rates comparable to any of the alternative methods. The process is also readily scalable. Whereas the current results were obtained with a CO partial pressure of only 50 Torr, the non-equilibrium vibrational up-pumping necessary to drive the reaction has been demonstrated to also occur at CO pressures in excess of 1 atmosphere. The required laser power scales linearly with CO pressure, so that much higher throughputs can be achieved using a higher power CO laser. The CO pump laser is the most efficient known laser that is scalable to truly large continuous power levels. CO lasers have been built with a conversion efficiency ratio of 30%, from wall plug electrical power into laser beam power. CO lasers have already been demonstrated at continuous powers up to megawatts. At least half of the laser power is used i.e. is directly absorbed into the reactant vibrational mode.

The process of the present invention may also be given detailed kinetic study and development as applications require. Steady-state and time-resolved infrared, visible and UV emission Fourier transform spectroscopy may be used to measure, for example, the distribution function of FIG. 4, the reactant temperature, and the C, $C_2$, and Fe emission. UV/visible absorption/fluorescence spectroscopy, as well as Raman spectroscopy, may be used to study infrared inactive species and monitor the quality of the nanotubes. The process shows potential for further control and extension by the use of applied electric fields as described herein. It has also been shown that significant carbon cluster ions, and free electrons, are formed in the reactor. These species may have an important influence on nanotube production and transport in an electric field.

The production process described in the present invention occurs at considerably lower gas kinetic temperatures than competing pyrolytic methods, which provides the potential to introduce more thermally delicate materials such as nanochannel membranes with the goal of growing single-walled carbon nanotubes on or in these materials.

The method of the present invention consequently produces the carbon necessary for the growth of carbon nanotubes and other carbon clusters while making possible the maintenance of a near room temperature translational temperature in the plasma. The buffer gas content in the gas mixture may be adjusted in order to control the temperature of the gas. This method allows controlling the production conditions much more precisely than previous approaches. Previous techniques employed a furnace to generate the disproportionation reaction at higher temperature, 1200° C., in thermal equilibrium. The method of this embodiment leads to a nanotube production rate of 20 mg/h.

The process lends itself to detailed kinetic study and development. Steady-state and time-resolved infrared, visible and UV emission Fourier transform spectroscopy may be used to measure, for example, the distribution function of FIG. 4, the reactant temperature, and the C, $C_2$, and Fe emission. UV/vis absorption/fluorescene spectroscopy, as well as Raman spectroscopy, may be used to study infrared inactive species and the quality of the nanotubes.

The process shows potential for further control and extension by the use of applied electric fields. It has also been shown that significant carbon cluster ions, and free electrons, are formed in the reactor. These species may have an important influence on nanotube production and transport in an electric field.

The process occurs at considerably lower gas kinetic temperatures than competing pyrolytic methods, which provides the potential to introduce more thermally delicate nanochannel membranes with the goal of growing single-walled carbon nanotubes within pre-existing nanochannels.

The present invention also offers the possibility that one may control the orientation, diameter, and length of single-walled carbon nanotubes, in a manner similar to that already demonstrated for non-single-walled carbon nanotubes. The ends of nanochannel membranes of materials like anodic alumina with metal catalysts may be coated, and these modified membranes may be introduced as substrates into the process. Synthesis may then be examined as a function of geometry, flow, electric fields, and standard plasma conditions. There are various techniques to etch away the anodic alumina membranes leaving behind carbon nanotubes of remarkably narrow distributions in diameter and length. Since single-walled carbon nanotubes have known electrical properties (such as being conducting or semiconducting) that vary with geometry, the ability to produce specific diameters and lengths of nanotubes would be very useful.

BN laminations produce potential oscillations on the scale of a few angstroms. Ions entering nanochannels will therefore experience potential differences on the order of 0.1 eV (the size of contact potentials), corresponding to electric field strengths approaching $10^7$ V/cm. This is far in excess of any fields that can be created by sending ions through plates with applied voltages. The production of layers of different materials along a nanochannel (as in nanolaminates) may enable the ions in keV ion beams to experience intense periodic fields in a matter somewhat analogous to the intense, nonlinear interactions of molecules with light. Varying the nanochannel diameter may offer an unusual way to control the strength of these interactions.

In one preferred embodiment, the total pressure in the plasma cell is chosen to be 730 Torr with a CO partial pressure of 530 Torr and an argon partial pressure of 200 Torr. The carbon monoxide is supplied out of a steel gas cylinder resulting in an addition of an unspecified amount of iron pentacarbonyl which is always present in CO supplied from steel cylinders. The CO laser power is set to 25 Watts. Under these conditions, a red glow from what is believed to be large carbon clusters is visible to the naked eye along the laser beam axis. Suddenly, a change of state occurred and the plasma cell filled the entire cell volume, around 0.5 gallon, i.e. a blue glow, believed to be $C_2$ Swan band emission from carbon molecules, filled the cell volume. Although not limited to the theory of the invention, it may be that the CO disproportionation reaction together with the carbon cluster formation combine to an exothermic, self-sustained reaction. At this point in time, the importance of this effect for the formation of large carbon clusters, particularly carbon nanotubes, has not been evaluated. However, the possibility of driving a self-sustained exothermic reaction forming carbon from carbon monoxide is potentially very significant for a low-cost large quantity production of large structured carbon clusters. Accordingly, the invention includes the method of the present invention wherein the reaction conditions, such as those of the energy density equivalent to the described system is such that an exothermic, self-sustained reaction occurs. The appropriate energy density may be arrived at through use of varying excitation wattage as applied to differing partial pressures of carbon monoxide. This energy density can, accordingly, be arrived at through a variety of reaction conditions through calculation or extrapolation from the given example, or based on the visual examination of the reaction cell to determine initiation of this self-sustained reaction.

REFERENCES

[1] Kroto, et al., Nature, Vol. 318, No. 6042, pp. 162–163, Nov. 14, 1985
[2] S. Iijima, Helical Microtubules of Graphitic Carbon, Nature 1991, 354, p56
[3] B. I. Yakobson, R. E. Smalley, Am. Sci. 85, 1997, p324
[4] Bethune, D. S.; Kiang, C. H.; DeVries, M.; Gorman, G.; Savoy, R.; Vazquez, J.; Beyers, R. Nature 1993, 363, p605.
[5] Journet, C.; Maser, W. K.; Bernier, P.; Loiseau, A.; Delachapelle, M. L.; Lefrant, S.; Deniard, P.; Lee, R.; Fischer, J. E. Nature 1997, 388, p756.
[6] Thess, A.; Lee, R.; Nikolaev, P.; Dai, H. J.; Petit, P.; Robert, J.; Xu, C. H.; Lee, Y. H.; Kim, S. G.; Rinzler, A. G.; Colbert, D.T.; Scuseria, G. E.; Tomanek, D.; Fischer, J. E.; Smalley, R. E. Science 1996, 273, p 483.
[7] Hongjie Dai, Physics World, June 2000, p 43
[8] Pavel Nikolaev, Michael J. Bronikowski, R. Kelley Bradley, Frank Rohmund, Daniel T. Colbert, K. A. Smith, Richard E. Smalley, Chem. Phys. Lett. 1999, 313 p 91
[9] M. Capitelli (ed.): Non-equilibrium Vibrational Kinetics, Springer, Berlin, 1986
[10] C. Park: Nonequilibrium Hypersonic Aerodynamics; Wiley, New York, 1990
[11] Urban et al., Chem. Phys. 1989, 130, p 389
[12] I. Adamovich, S. Saupe, M. J. Grassi, O. Shulz, S. Macheret, and J. W. Rich, Chem. Phys. 1993, 173, p 491
[13] E. Plönjes, P. Palm, Andrey P. Chemukho, I. V. Adamovich, and J. W. Rich, Chem. Phys. 2000, 256, p 315
[14] J. W. Rich et al., Chem. Phys. 1979, 44, No. 1
[15] Bergman and Rich, Proc. Intl. Conf. Lasers 1980, p 265
[16] Anex and Ewing, J. Phys Chem. 1986, 90, p 1604
[17] V. V. Subramaniam, U.S. Pat. No. 5,094,915

The foregoing references are hereby incorporated herein by reference.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A method of preparing carbon molecular clusters, said method comprising the steps of:
   (a) providing a feedstock comprising at least one carbon precursor material having chemical bonds and being capable of undergoing a reaction so as to provide carbon atoms for the formation of said carbon molecular clusters;
   (b) subjecting said carbon precursor material to a non-equilibrium excitation of the vibrational modes of said chemical bonds so as to cause said carbon precursor material to undergo said reaction so as to provide the carbon atoms for the formation of said molecular clusters; and
   (c) allowing said carbon atoms to come into contact with a catalyst so as to form said molecular clusters.

2. A method according to claim 1 wherein said carbon molecular clusters form into an arrangement selected from the group consisting of single-walled carbon nanotubes, multi-walled carbon nanotubes, and fullerenes.

3. A method according to claim 1 wherein said feedstock additionally comprises at least one buffer gas.

4. A method according to claim 3 wherein said at least one buffer gas is selected from the group consisting of argon, helium and mixtures thereof.

5. A method according to claim 3 wherein said at least one buffer gas is present in an amount sufficient to maintain the translational temperature of the excited carbon produced by said excitation below 200° C.

6. A method according to claim 1 where the translational mode temperature of said feedstock is maintained at a value in the range from about 100 K to about 3000 K.

7. A method according to claim 1 where the translational mode temperature of said feedstock is maintained at a value in the range from about 100 K to about 1000 K.

8. A method according to claim 1 wherein said feedstock is in the form of a fluid, and wherein the flow of said fluid provides convective cooling sufficient to maintain the translational temperature of the excited carbon precursor produced by said excitation below 200° C.

9. A method according to claim 1 wherein said catalyst is a solid state catalyst.

10. A method according to claim 9 where said solid state catalyst is a nanochannel membrane.

11. A method according to claim 1 wherein the catalyst is formed from said feedstock.

12. A method according to claim 11 wherein said catalyst comprises a gaseous metal carbonyl.

13. A method according to claim 12 wherein said metal carbonyl is selected from the group consisting of iron pentacarbonyl, nickel tetracarbonyl and mixtures thereof.

14. A method according to claim 1 wherein said carbon atoms provided by said reaction are bound to said catalyst.

15. A method according to claim 1 wherein said vibrational excitation is brought about by laser radiation.

16. A method according to claim 15 wherein said laser radiation is created by a carbon monoxide gas laser.

17. A method according to claim 1 wherein said vibrational excitation is brought about by an electric discharge.

18. A method according to claim 1 wherein said vibrational excitation is brought about by a supersonic expansion.

19. A method according to claim 1 wherein said feedstock additionally comprises at least one additional carbon-containing molecule.

20. A method according to claim 19 wherein said at least one additional carbon-containing molecule is methane.

21. A method according to claim 1 wherein a direct current electric field is applied during the formation of said carbon molecular clusters to enhance the production of said carbon molecular clusters.

22. A method according to claim 1 wherein said feedstock additionally comprises at least one precursor material having chemical bonds and being capable of undergoing a reaction so as to provide constituent atoms other than carbon for the formation of said molecular clusters.

23. A method according to claim 22 wherein said at least one precursor material is selected from the group consisting of BN, $BC_2N$, or $BC_3$ precursors or a mixture thereof.

24. A method according to claim 1 wherein said carbon molecular clusters are isotopically enriched toward heavier carbon isotopes compared to the isotopic composition of said carbon precursor material.

25. A method according to claim 1 additionally comprising the step of depositing said carbon molecular clusters onto a substrate.

26. A method according to claim 1 additionally comprising the step of depositing said carbon molecular clusters onto a substrate, said substrate having a chemical or physical characteristic unable to withstand the conditions necessary to bring about said excitation through equilibrium excitation.

27. A method according to claim 1 wherein the energy density of said non-equilibrium excitation is sufficient to cause said reaction to become self-sustained.

28. A method of preparing molecular clusters, said method comprising the steps of:
(a) providing a feedstock comprising at least one precursor material having chemical bonds and being capable of undergoing a reaction so as to provide constituent atoms for the formation of said molecular clusters;
(b) subjecting said precursor material to a non-equilibrium excitation of the vibrational modes of said chemical bonds so as to cause said precursor material to undergo a reaction so as to provide constituent atoms other than carbon; and
(c) allowing said constituent atoms to come into contact with a catalyst so as to form molecular clusters.

29. A method according to claim 28 wherein said at least one precursor material is selected from the group consisting of BN, $BC_2N$, or $BC_3$ precursors or a mixture thereof.

30. A method according to claim 29 wherein said molecular clusters are boron nitride nanutubes.

* * * * *

UNITED STATES PATENT AND TRADEMARK OFFICE
CERTIFICATE OF CORRECTION

PATENT NO. : 6,855,301 B1
DATED : February 15, 2005
INVENTOR(S) : Rich et al.

It is certified that error appears in the above-identified patent and that said Letters Patent is hereby corrected as shown below:

Title page,
Item [56], References Cited, OTHER PUBLICATIONS, please delete "Yakobson et al., *Fullerene Nanotubes: C1,000,000 and Beyond.* American Scientist vol. 85, pp. 824 - 337 (1997), no month*." and insert -- YAKOBSON et al., *Fullerene Nanotubes: $C_{1,000,000}$ and Beyond*, American Scientist Vol. 85, pp. 324 - 337, (1997). --; please delete "Rich et al., *C2 and CN Formation by Optical Pumping of COAr and CoN2 Ar Mixtures at Room Temperature*, Chemical Physics 44, pp. 53 - 64 (1979), no month*." and insert -- RICH et al., *$C_2$ and CN Formation by Optical Pumping of CO/Ar and CO/$N_2$/Ar Mixtures at Room Temperature*, Chemical Physics 44, pp. 53 - 64 (1979). --.

Column 12,
Line 30, please delete "fluorescene" and insert -- fluorescence --.

Column 14,
Lines 1-3, please delete "[13] E. Plönjes, P. Palm, Andrey P. Chemukho, I. V. Adamovich, and J. W. Rich, Chem. Phys. 2000, 256, p. 315" and insert -- [13] E. Plönjes, P. Palm, Andrey P. Chernukho, I.V. Adamovich, and J. W. Rich, Chem. Phys. 2000, 256, p 315 --.

Signed and Sealed this

Tenth Day of May, 2005

JON W. DUDAS
*Director of the United States Patent and Trademark Office*